March 27, 1951 R. A. PATTEN 2,546,165
MECHANISM FOR SUGAR CANE HARVESTING
Filed Sept. 5, 1944 8 Sheets-Sheet 1
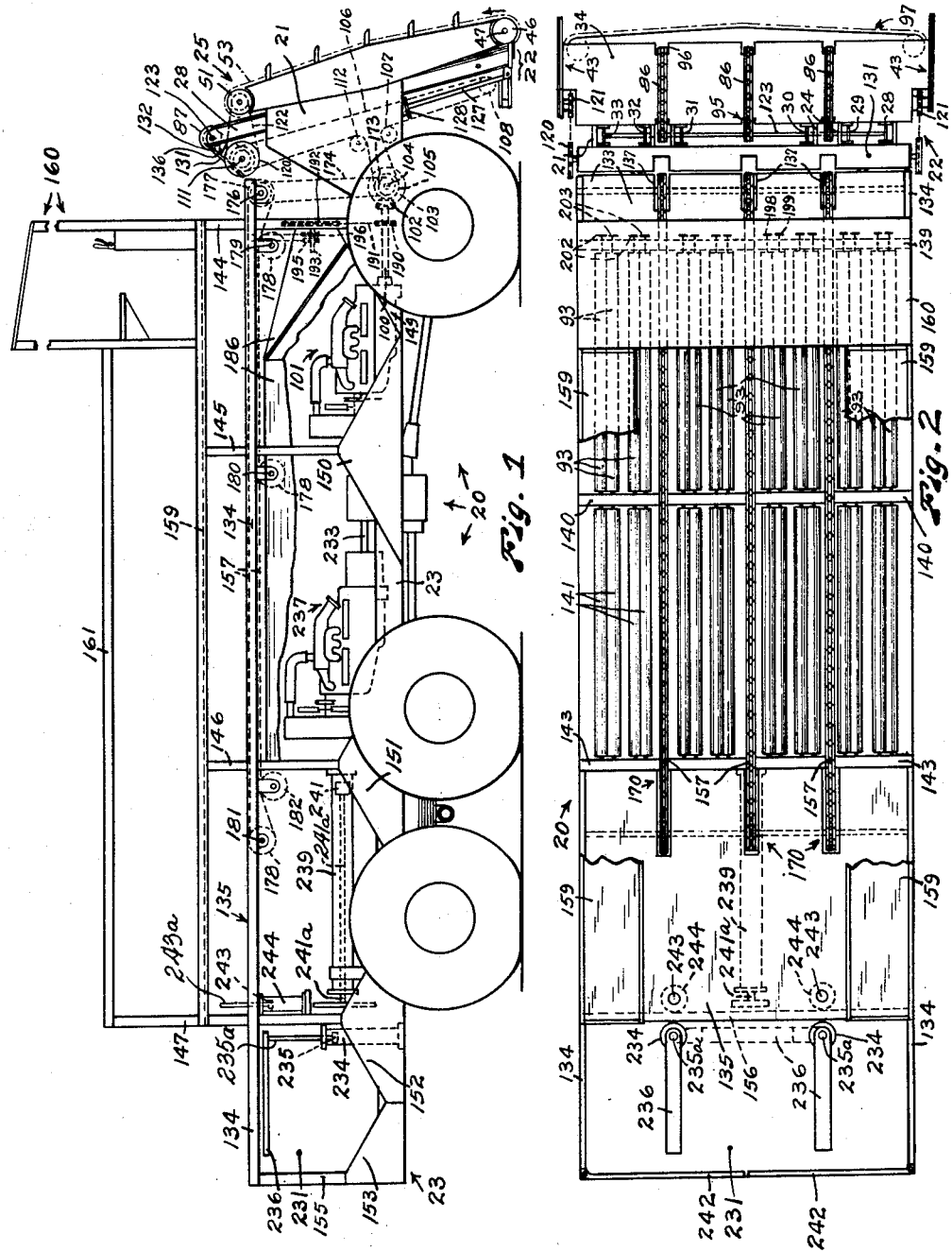
INVENTOR
Robert Alexander Patten
BY
Arnold and Mathis
ATTORNEYS March 27, 1951  R. A. PATTEN  2,546,165
MECHANISM FOR SUGAR CANE HARVESTING
Filed Sept. 5, 1944  8 Sheets-Sheet 2
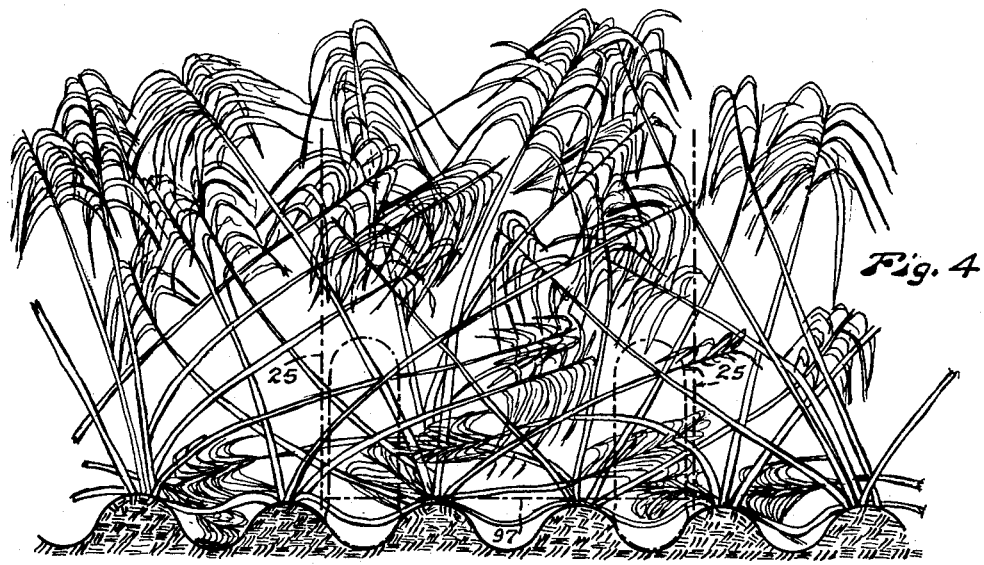
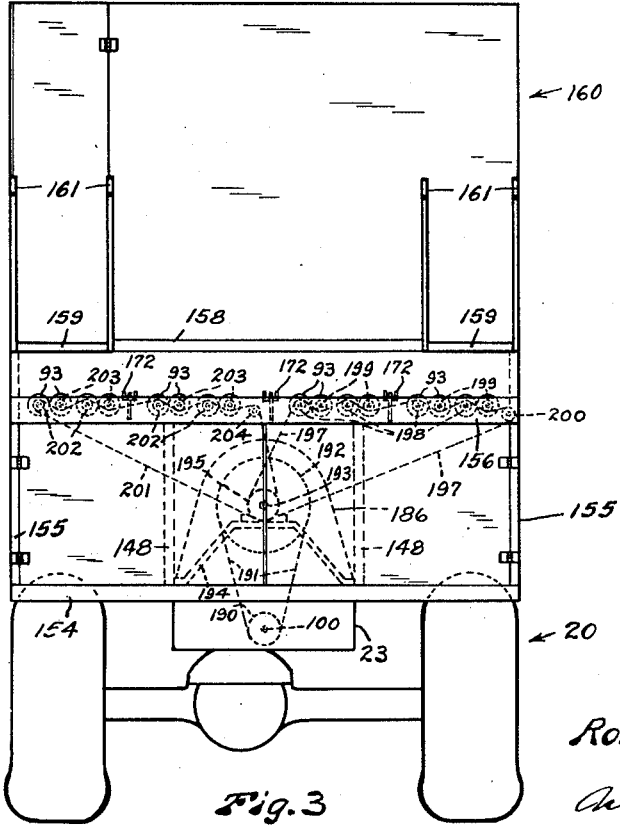
INVENTOR
*Robert Alexander Patten*
BY
*Arnold and Mathis*
ATTORNEYS March 27, 1951  R. A. PATTEN  2,546,165
MECHANISM FOR SUGAR CANE HARVESTING
Filed Sept. 5, 1944  8 Sheets-Sheet 3

INVENTOR
Robert Alexander Patten
BY
Arnold and Mathis.
ATTORNEYS

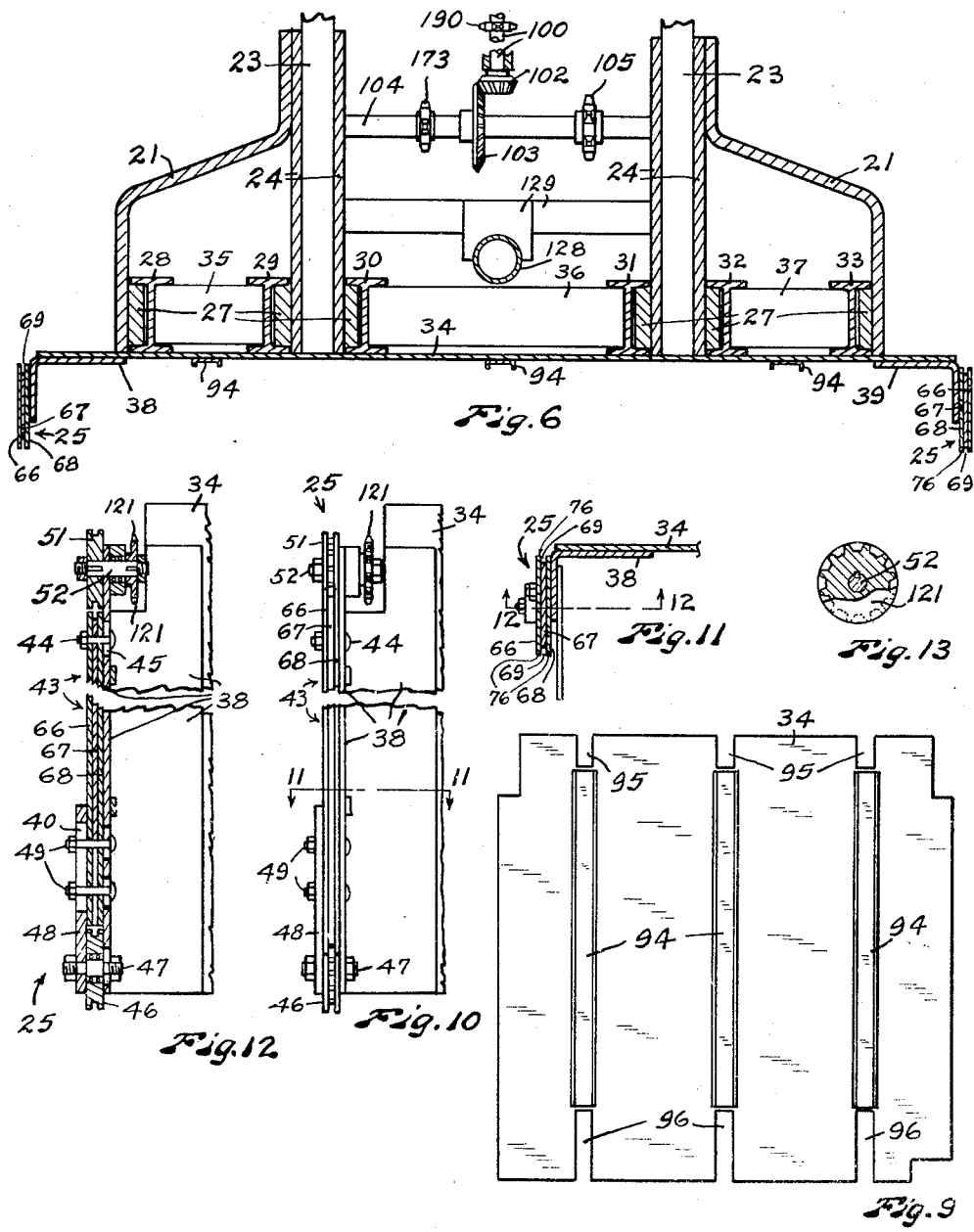

March 27, 1951  R. A. PATTEN  2,546,165
MECHANISM FOR SUGAR CANE HARVESTING
Filed Sept. 5, 1944  8 Sheets-Sheet 5
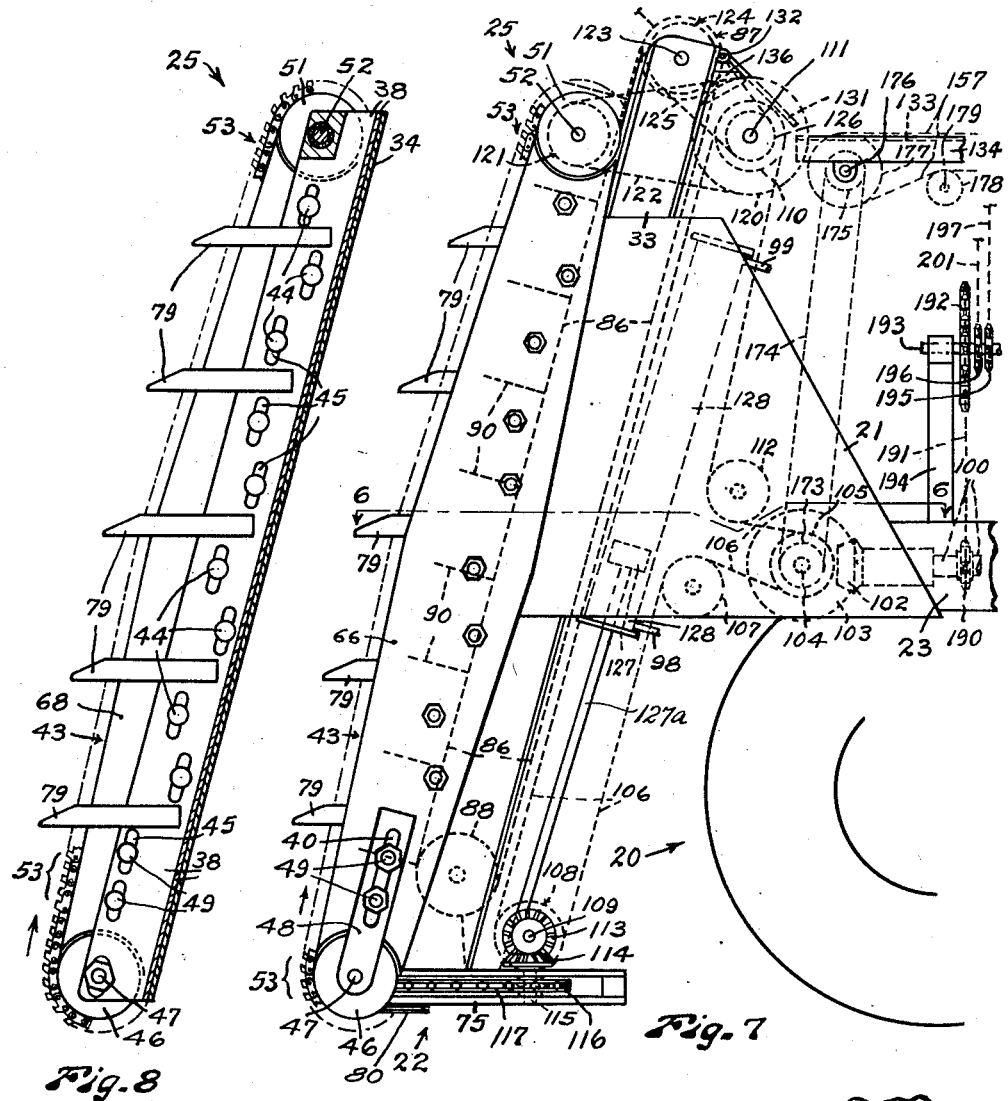
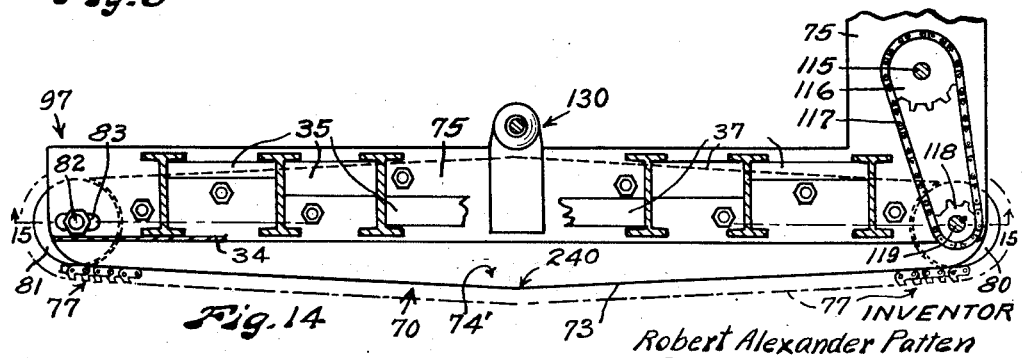
INVENTOR
Robert Alexander Patten
BY
Arnold and Mathis
ATTORNEYS INVENTOR.
Robert Alexander Patten
BY
Arnold and Mathis
ATTORNEYS

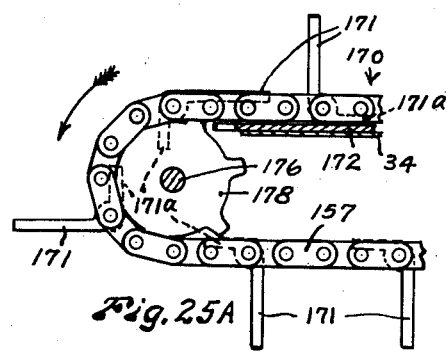
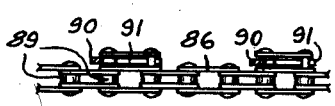 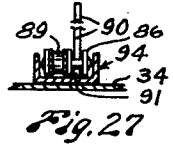
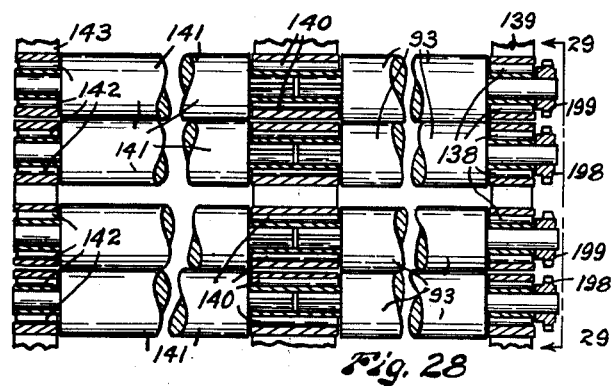
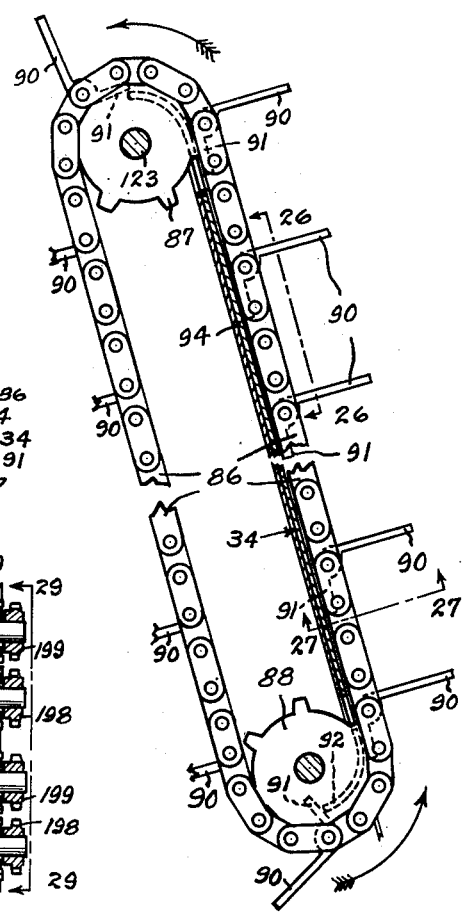
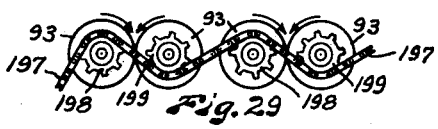
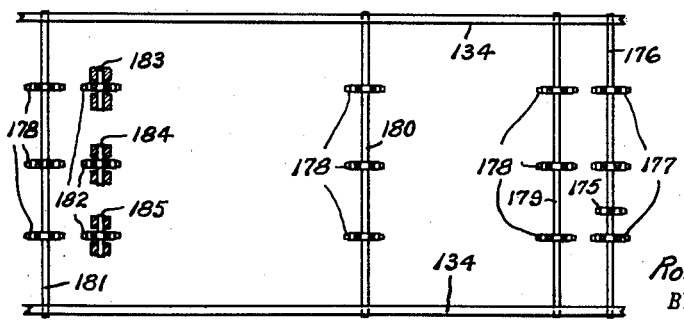
INVENTOR.
Robert Alexander Patten
BY
Arnold and Mathis,
ATTORNEYS March 27, 1951  R. A. PATTEN  2,546,165
MECHANISM FOR SUGAR CANE HARVESTING
Filed Sept. 5, 1944  8 Sheets-Sheet 8

INVENTOR.
Robert Alexander Patten
BY
Arnold and Mathis
ATTORNEYS

Patented Mar. 27, 1951

2,546,165

UNITED STATES PATENT OFFICE 2,546,165

MECHANISM FOR SUGAR-CANE HARVESTING

Robert Alexander Patten, Seattle, Wash.

Application September 5, 1944, Serial No. 552,726

37 Claims. (Cl. 56—17)

My invention relates to a method of sugar cane harvesting and to mechanism for carrying out said method.

More particularly my invention relates to providing a mechanism and a method for mechanically severing the sugar cane stalks, at a rate of speed sufficiently high to permit mounting the mechanism for operation while being transported by a truck, with particular regard for avoiding injury to the roots, and removing their leaves, and depositing the leaves in the field for root protection and traction. One of the important and controlling factors in providing a process and means for mechanically severing the cane relates to the safe-guarding of the roots, both by the mode of operation of the severing means and from the treads of the wheels, so that the growing of the new stalks is not delayed.

The harvesting of sugar cane is becoming a serious problem. There are certain conditions inherent in the growing of sugar cane that have heretofore operated to restrict the harvesting thereof to manual cutting as opposed to mechanical cutting or harvesting. These conditions, particularly in the Hawaii district are as follows:

It will be understood that the sugar cane is grown ordinarily in rows spaced thirty-six inches apart. The cane must be cut in such a manner as to not disturb the roots because to do so prevents the new crop of sugar cane starting at once to grow after the cutting down of the matured stalks. The stalks have a hard annular shell at the base with a sugar producing sticky pith center. Accordingly, up to the present time manual cutting has been found to be the most practical and safest method to cut the cane, because for one reason such method is attendant with the least injury to the roots.

Another condition which must be met in the Hawaii area is that the character of the ground is very wet due to the almost daily rain fall and therefore soft for practically twelve months of the year. Consequently the providing of traction for any mechanical operating device presents a most difficult problem. Ordinary Caterpillar tractor treads are most injurious to the roots and kill the plants. Therefore, such treads cannot be employed. Pneumatic tires operating at the ordinary high pressures and of ordinary sizes upon the water drenched ground itself would not afford the necessary traction in many places. Most of the sugar cane fields are in hilly country so that considerable extra traction is necessary and by so much the more the problem of providing the necessary degree of traction is increased. The rows of cane sugar, it will also be understood, extend along the side of the hill to prevent erosion of the soil rather than run directly up and down hill, but this does not mean that the rows are without grade because their course is up and down even though they extend lengthwise of the hill so that traction effort is involved both in holding the truck on the slope and providing for propulsion. Thus, the truck and mechanism of my invention must move along the rows on the slopes where ordinarily trucks do not travel and in my invention I must provide for traction to carry the cutting mechanism against the cane stalks as herein set forth over and above that traction necessary to hold the truck on the hill slope as well as to propel the truck.

The sugar cane must be stripped of its leaves before the stalk is crushed. The leaves contain a juice which is very inimical to the full production or yield of sugar from the cane. It requires some two or three more tons of cane to make a ton of sugar when the juice of the leaves intermingles with the juice of the cane stalks. Accordingly, the removal of the leaves is an important matter and this is ordinarily done in one of two methods:

The leaves are cut from the stalk by hand and left in the field; or, the leaves while still attached to the cane stalks, according to the practice followed by a few operators, are taken to the sugar mill and there removed. Then the leaves are burned and the ashes taken back as fertilizer to the field. Also, removing the leaves is accomplished by setting fire to the field of cane and burning off the leaves. However, such burning of the sugar cane kills the stalks and immediately deterioration sets in and after twelve hours, the deterioration becomes most rapid so that it requires two to three tons more of the cane to make one ton of sugar than when the leaves are removed without burning. Such burning is delayed until just before cutting even though this involves burning during the night to have the field ready for cutting in the morning. The resorting to burning, even though highly objectionable in that it sets up deterring forces, emphasizes the importance of eliminating the leaves before crushing the stalk in the making of sugar. My invention renders such burning unnecessary.

Another difficulty in providing mechanical cutting of the sugar-cane is that the cutting mechanism becomes clogged with the sticky sugar cane pith gradually building up a hard mass so that the cutting means very shortly lose their cutting ability or efficiency. Any mechanical cutting must include means for keeping the cutting means clean and this must preferably be done through the operation of the cutting means itself rather than by any brushing mechanism. That is, the cutting means must be self cleaning. The character of the ground in the Hawaii area likewise presents a serious problem to providing mechanical cutting means in that it is very rocky and rough or uneven ground so that the cutting mechanism must be of a character which may be operated in a manner which will avoid coming into contact with the rocks which cover the field and are of varying size.

Another complicating factor is that the sugar cane does not, for a large part, stand erect. Stalks from one row will lean over and extend across even the next two or three adjacent rows and at all angles so that there becomes a heavy intermatting and intermingling of the cane providing a veritable "jungle" as it were.

Moreover, a difficulty arises in that fields having sugar cane at different stages of growth or development are often located directly adjacent to each other. This renders it necessary that any proposed mechanical cutting mechanism shall be adapted to cut a channel, as it were, through the field because in such fields there are not outside borders which may be run upon by the vehicle mounting the cutting mechanism to cut a swath on one side and then across the ends.

Since the sugar cane stalk has a hard exterior portion at the cutting section, and since it has a sugar producing inner pith portion which operates to form an agglomerated mass and serves to clog the cutting mechanism, its mechanical cutting has been long sought, but so far in vain.

Reciprocating knives have been suggested but have not solved the problem of mechanically cutting sugar cane. Such knives readily become clogged and are also injurious to the roots, tending to push the roots out of the ground. Circular saws become clogged and then push out the roots. Revolving knives—knives protruding from a revolving disc—are objectionable as they knock out or loosen the roots. Any disturbed cane roots die. Likewise, radially directed knives carried by an endless chain produce a shock when they engage the cane stalk which not only is injurious to the roots of the cane but results in a serious and objectionable vibration to the mechanism. Trucks with Caterpillar treads crush the roots. Trucks with dual pneumatic tires do not properly distribute the load pressure and injure the roots. Such operation then requires crews of men to replace and replant the cane with unavoidable delay in yield.

With these various conditions in mind, my purpose is to provide for mechanically harvesting of sugar cane and to provide a method and mechanism which will overcome each and all of the various difficulties above set forth. Particularly it is a primary object of my invention to provide a method and mechanism of mechanically harvesting sugar cane which will not injure the roots and thus will not impede the prompt growing of the new crop. Also, it is a primary object of my invention to secure the greatest yield possible of sugar per ton, that is, which will eliminate reduction in yield by any contaminating juices from the leaves and which will avoid any burning of the leaves and thereby avoid any lowering of the yield incident to heating due to the burning. Further, it is a primary purpose of my invention to provide a cutting mechanism which is so designed that by its own operation it will be self cleaning. Also, it is a primary purpose of my invention to remove the leaves from the stalks in the field and discharge them beneath the wheels of the truck carrying the cutting mechanism, thereby providing for the necessary traction on wet ground without injury to the roots of the cane. And particularly is it a primary object of my invention to reduce to a minimum the period of time required to cut the sugar cane, cutting the same close to the roots, and deliver it to the sugar processing mill, thus avoiding deteriorating effects and providing for the maximum yield per ton of cane.

A further purpose of my invention is not only to remove leaves and tops from the cut cane stalks and leave these in the field, but also to separate the weeds so that only the cane stalks are transported to the mill. When canes, leaves, tops and weeds are hauled to the mill it requires about ten to eleven tons of such to make one ton of sugar while it only requires about six to seven tons of the cane minus the leaves, tops and weeds to produce one ton of sugar. Thus an important saving in hauling with corresponding less risk of injury to the roots is effected by my invention.

In general, I provide in my invention a vehicle and a cutting mechanism mounted upon the front end of said vehicle, which mechanism is quickly elevatable to pass over rocks or other obstructions which would injure the cutting mechanism. Also, I provide a link type of special design, as the cutting mechanism, which mechanism is self-cleaning so that the sugar producing pith of the cane stalk does not long adhere to and clog the cutters. I provide mechanism which causes the saw to operate at high speed and thus provides a saw cut without shock to the stalk and then I preferably have an entering wedge carried by the blade or link chain guide to cause the uncut portion of the annular hard ring of the stalk to break without waiting for the high speed link cutting means to engage such portion. Thus, by combining the feature of high speed sawing and the feature of breaking the uncut portion, I provide for exceeding high speed severing of the stalks and this without injury to the roots. In doing this I take advantage of the fact that the outside portion of the stalk at the cutting line near the root is relatively hard and brittle. However, without the wedge action and partial stalk breaking feature, I also can entirely cut through the stalk with the high speed link chain of my invention without injury to the roots. I provide such speed of saw chain of my design that the cutting of the hard annular part of the stalks is performed without injury to the roots. I provide for making a saw cut by removing from the stalk small sections or segments in the following order of rotation; a segment on the outside of said cut, next from the central portion of said cut, then a segment from the other side of said cut, then central portion of said cut and then a segment from the first mentioned side where an outside cut was made.

The above mentioned general objects of my invention, together with others inherent in the same, are attained by the mechanism illustrated in the following drawings, the same being a preferred exemplary form of embodiment of my invention, throughout which drawings like reference numerals indicate like parts:

Figure 1 is a view in side elevation of mechanism embodying my invention, parts being shown diagrammatically;

Fig. 2 is a plan view of said mechanism with parts broken away and parts shown diagrammatically;

Fig. 3 is a rear view of said mechanism, showing particularly the driving mechanism for the leaf stripping rollers;

Fig. 4 is a diagrammatic view showing rows of sugar cane and showing stalks of cane extending across other rows and in some cases prone on the ground and showing by dot and dash lines an operative position of horizontal and upright cutter members and of the mounting vehicular wheels relative to the rows of sugar cane;

Fig. 6 is a view partly in section and partly in plan taken substantially on broken lines 6—6 of Fig. 7 showing cane cutting and elevating means and portions of the supporting frame;

Fig. 7 is a side view of the front end portion of the machine, parts of the cutter and elevator driving means being shown diagrammatically and hoisting means for the cane cutting and cane elevating means being shown partly by dotted lines;

Fig. 8 is a view partly in section and partly in elevation taken substantially on broken line 8—8 of Fig. 5 showing the inner face of one of the side cutter units;

Fig. 9 is a detached view in front elevation on a smaller scale than Figs. 5, 6, 7 and showing the front plate of the machine on which are mounted the channels as trackways for the cane elevating mechanism;

Fig. 10 is a detached fragmentary front edge view of one of the side cutter members with the link teeth of the chain saw removed therefrom;

Fig. 11 is a cross sectional view of said side cutter member taken substantially on broken line 11—11 of Fig. 10;

Fig. 12 is a detached fragmentary vertical sectional view of said side cutter member taken substantially on broken line 12—12 of Fig. 11;

Fig. 13 is a detached view partly in section and partly in elevation of a recessed wheel of a type used in this machine for carrying the chain saws by which the cane is cut;

Fig. 14 is a detached top plan view with parts in section taken substantially on broken line 14—14 of Fig. 5 and showing a horizontal cane cutting assembly used in this machine;

Figure 18:
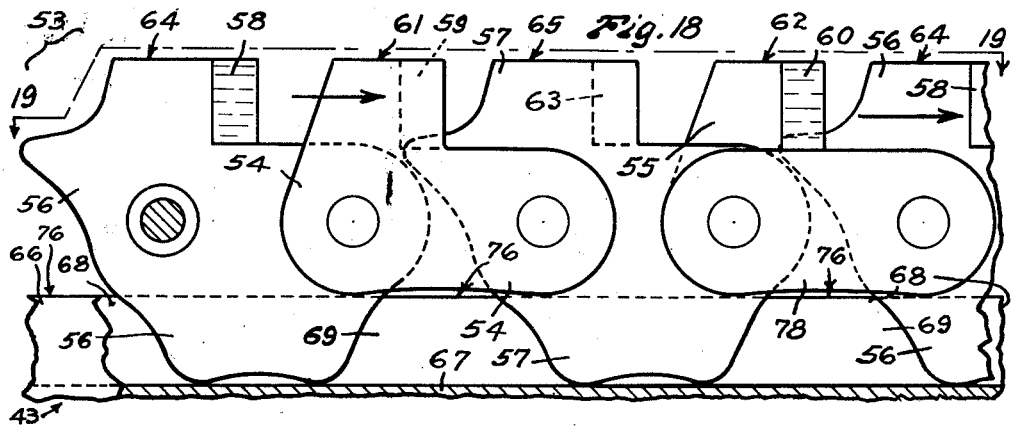
Fig. 18 is an enlarged fragmentary side elevation of chain saw type cutter means embodied in this invention.
Figure 19:
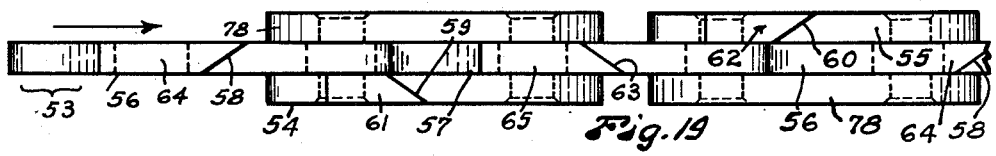
Fig. 19 is an edge view of said cutter means looking in the direction of broken line 19—19 of Fig. 18.
Figure 20:
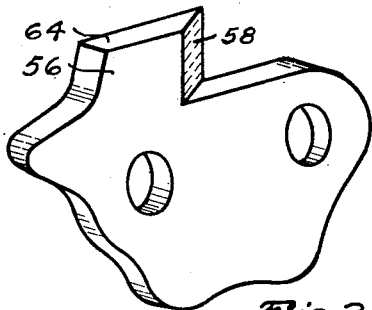
Figure 21:
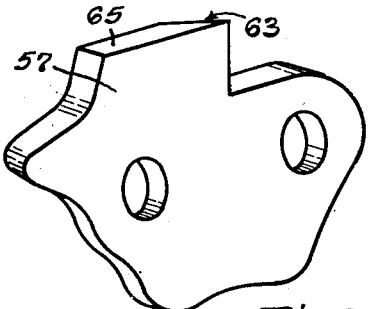
Figure 22:
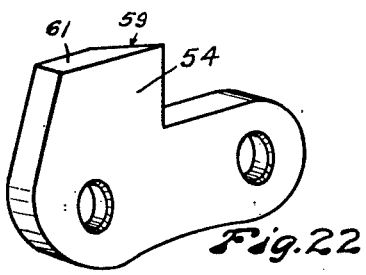
Figure 23:
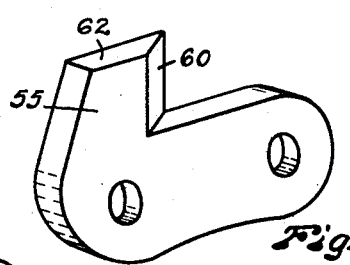
Figure 24:
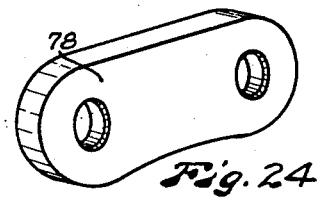
Figure 31:
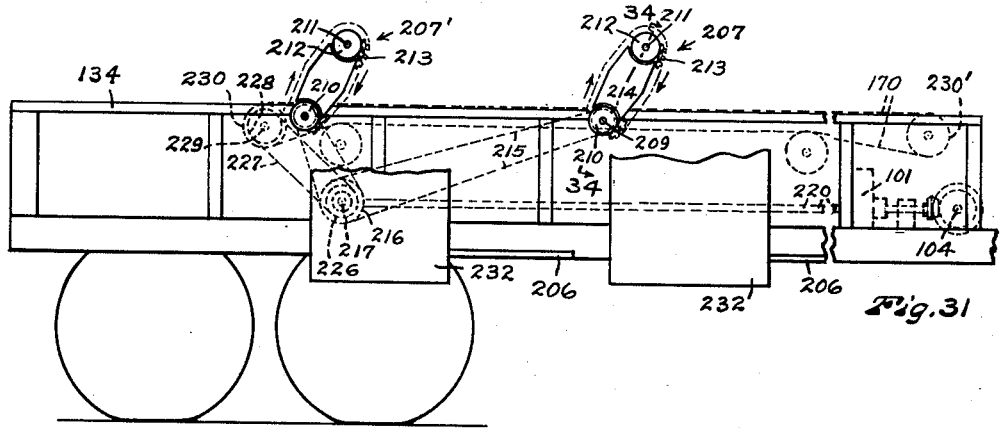
Figure 32:
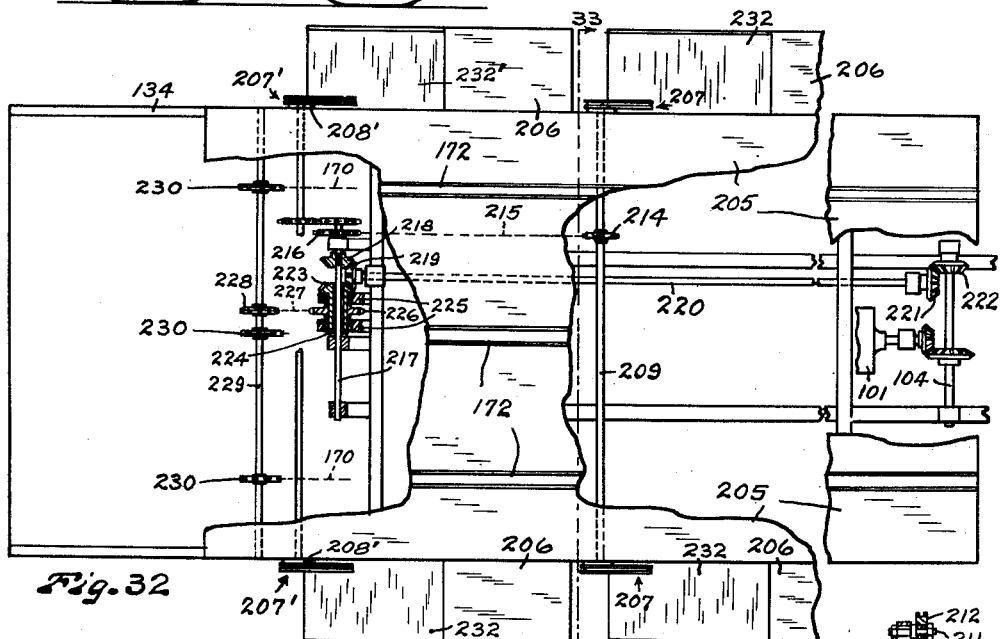
Figures 33, 34:
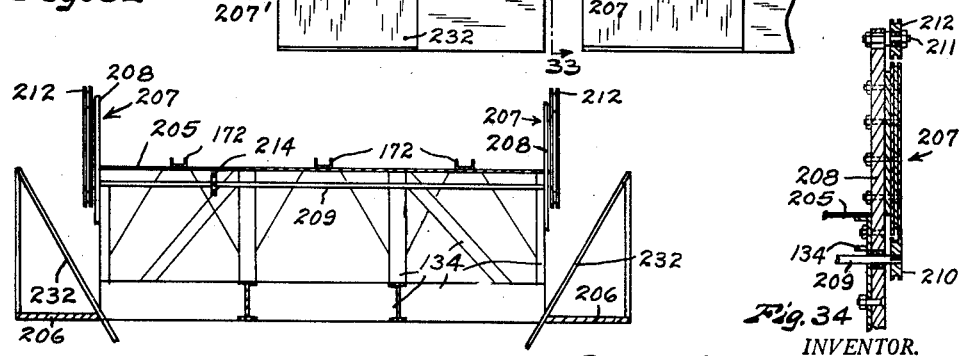

Figs. 20 to 24 inclusive are detached perspective views of links that are used in making up the cutter means shown in Figs. 18 and 19;

Fig. 25 is a fragmentary view partly in elevation and partly in section showing cane conveyor and elevating means embodied in this invention;

Fig. 25A is a fragmentary view partly in elevation and partly in section of the horizontal conveyor;

Fig. 26 is a fragmentary edge view of said conveyor means with parts in section taken substantially on broken line 26—26 of Fig. 25 and showing some of the conveyor lugs in cross section;

Fig. 27 is a view in cross section taken substantially on broken line 27—27 of Fig. 25;

Fig. 28 is a detached fragmentary view partly in plan and partly in section showing cane leaf stripping rollers embodied in this invention;

Fig. 29 is an end view of said rollers looking in the direction of broken line 29—29 of Fig. 28 and showing driving means for said rollers;

Fig. 30 is a somewhat diagrammatic plan view of the top conveyor drive means showing the same detached from the machine;

Fig. 31 is a fragmentary side elevation of a modified form of a cane harvester constructed in accordance with my invention that is provided with side saws for cutting the leafy top end portions off of the stalks of cane, parts being diagrammatically shown;

Fig. 32 is a fragmentary plan view with parts broken away and parts shown diagrammatically of the cane harvester shown in Fig. 31;

Fig. 33 is a view partly in cross section and partly in elevation taken substantially on broken line 33—33 of Fig. 32; and Fig. 34 is a view in longitudinal section of the side saw cutting means on dotted line 34, 34 of Fig. 31.

An all wheel driven truck or mobile carrier 20 is provided on its front end with mounting frame plates 21, upon which is slidably and floatingly mounted an elevatable cane cutting unit 22 which is capable of being both raised and lowered. The truck 20 may have truck side frame beams 23 either of I beam or channel beam form.

On each side of beams 23 are fixedly secured plates 24, see Fig. 6. Said mounting plates 21 are secured to plates 24 to provide outer support to the elevatable cutting unit 22. To plates 21 and 24 are secured vertically disposed guide members 27, Fig. 6. Thus is constructed the elevatable cane cutting unit mounting frame.

Figure 5:
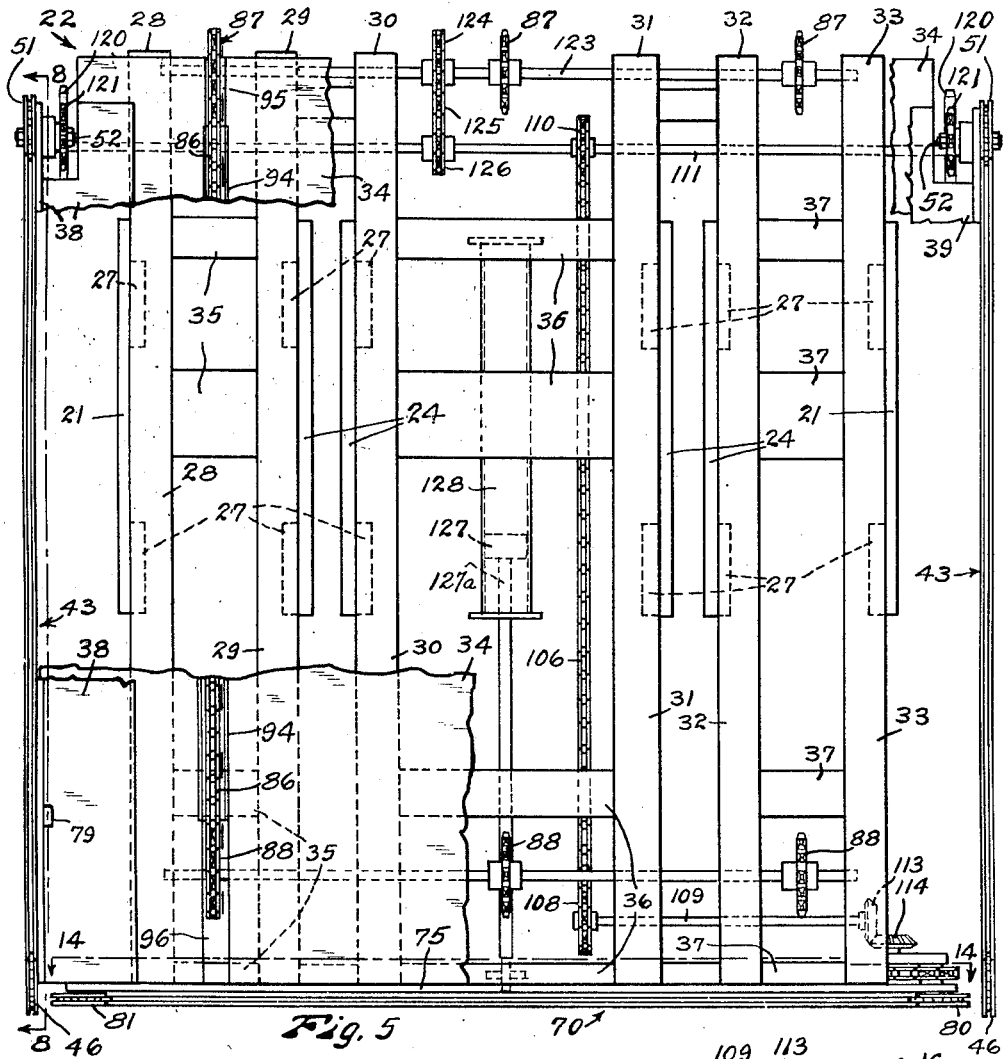
Fig. 5 is a view in front elevation of the elevator cane cutting unit, a major portion of a front plate being broken away and horizontal and upright cutter members including blades or cutter guides being shown with the cutters or link teeth removed.

The elevatable cane cutting and cane elevating unit 22 is formed as follows: Vertically disposed beams 28, 29, 30, 31, 32, and 33 (preferably I beam form) are disposed with the adjacent sides of the flanges slidably bearing against the guide members 27, see Fig. 6. On the front side of said beams 28 to 33 may be secured by welding a front plate 34 (Figs. 6, 9, and 11) thereby tying or uniting all of said beams together. Also, said beams, see Fig. 5, may be further secured together as follows: Beams 28 and 29 are secured together by four box-like members 35; beams 30 and 31 are secured by box-like members 36; beams 32 and 33 are secured by box-like members 37. Angle plates 38 and 39 (Figs. 6 and 11) may be welded on the outer side edge portions of the plate 34 as mounting means for the side cutting means, identified in general by numeral 25.

This side cutting means, identified generally as 25, is of special construction and design characterizing my invention. It comprises blades, or cutter guides 43, Fig. 8, vertically adjustably secured to angle plates 38 and 39 by bolts 44 extending through slots 45. Adjacent the lower ends of blades 43 are adjustably mounted idler sprocket wheels 46. Said wheels are mounted on axles 47 fixably secured to plates 48 (Fig. 7), which plates in turn are secured to angle plates 38 by bolts 49 disposed in slots 40. Adjacent the top ends of blades 43 are fixedly mounted driven sprockets 51, said sprockets being keyed on driven shaft 52 (Fig. 7).

Over said sprocket wheels 46 and 51 is mounted a specially constructed chain saw 53 forming part of my invention. These chain saws 53 are driven in a direction to cause them to cut the cane stalks while running upwardly and thus operate to pick and lift up cane stalks which may be lying prone close to the ground, and even so prone as to lie or droop down into the hollows or troughs between the rows. These saws I construct of side link cutting teeth units 54 and 55, each a side cutter cutting on opposite sides of the kerf. These side cutting units 54 and 55 are connected by center cutter units 56 and 57. Center link tooth unit 56 has a beveled cutting face 58 directed towards the side on which side tooth unit or link 54 is located while the bevel face 59 of side tooth link 54 is directed towards the side on which side tooth unit 55 is located. Side tooth link 55 has beveled cutting face 60 directed toward the side on which side unit 54 is located. Center teeth 56 and 57 take the place of raker teeth in ordinary saws. The special chain saw design of my invention is characterized by having no raker teeth whatever, all links of my chain being cutting, side or center, links excepting the dummy or connector links 78.

Side teeth links 54 and 55 have flat top faces 61 and 62 respectively lying in a plane parallel to the axis of the chain. Center cutting link 57 has beveled cutting faces 63 directed towards the side on which side link 55 is located. Likewise said center link tooth units 56 and 57 preferably have flat top faces 64 and 65 respectively lying in a common plane parallel to the axis of the chain. Having faces 58, 59, 63 and 60 disposed at right angles to the axis of the chain prevents the forming of a pocket and thereby operates to prevent the packing and clogging of cut material in front of each of said beveled faces. Having flat faces 64, 61, 65, and 62 lying in a common plane parallel to the axis of the chain provides for keeping the beveled cutting faces 58, 59, 63 and 60 of the same length even when said faces become nicked and require grinding back. This provision greatly facilitates keeping the beveled cutting edges sharp and the same length. It makes possible grinding one link face without regard to any other link and still maintain them all of uniform length. Dummy links 78 are positioned on each side opposite side cutter links 54 and 55 to balance and complete the chain.

Side cutter blade or guide 43 (see Figs. 6, 7, 8, 10, 11, and 12) may be formed of three plates, 66, 67 and 68, each one-eighth inch thick. These plates may be riveted together and then bolted to their supporting angle plates 38 and 39 (Figs. 10, 11 and 12). This construction provides for the recess 69 (Figs. 6, 11 and 18) into which extends the portion of center cutter links 56 and 57 opposite the teeth so that the edge of the said links opposite the flat faces 64 and 65 (Fig. 18) may ride upon the edges of plate 67 at the bottom of said recess 69 while the edges of side cutter links 54 and 55 opposite faces 61 and 62 and the corresponding edges of dummy links 78 may ride on the edges 76 as a trackway. Providing these trackways for the teeth prevents the teeth links from tilting.

Bottom cane cutting mechanism 97 is quite similarly constructed as the side cane cutting mechanism 25 but with some differences. Such mechanism comprises a blade or guide 70, Figs. 5, 14 and 15, preferably formed of a one-eighth inch outside plate 71, a one-eighth inch center plate 72, and a one-fourth inch outside plate 73. The latter plate 73 has a tapered or beveled front edge 74. Blade 70 is secured to mounting plate 75 which also has a tapered or beveled front edge 74' as a continuation of beveled edge 74. The purpose of these beveled edges 74 and 74' is to form a wedge to enter the saw kerf or cut and pry forward the cane stalk (see Fig. 17) when partially cut through and cause the stalk to break without the saw cutting entirely through the stalk. Mounting plate 75 is welded to the end portion of the I beams 28, 29, 30, 31, 32, and 33.

The bottom chain saw 77 (Fig. 14) is constructed in all ways similar to the side saw 53—its links being in all ways identical so that all the links of both the side cutting chains and bottom chain are interchangeable.

Cane stalk stop bars 79 (Figs. 7 and 8) are secured on angle plates 38 and 39 and constitute means against which the cane stalks will be carried by the side chain saws 53 and there held while being cut. The cane elevating means hereinafter to be described assists the side cutter mechanism 25 in carrying the stalks against stops 79. Side chain saws 53 will not have as many pieces or stalks to cut as the bottom saw chain 77 and the stalks will be of less diameter. However, the stalks in the upper portion are tougher than the larger portions of the stalks next to the ground. Near the ground the stalks are more brittle even though they are of greater diameter. The speed of the saws can readily be adjusted to make the cutting uniform as to sides and bottom cutter through changing the size of the driving or driven sprockets next to be described. The difference in time of cutting would be exceedingly relatively small with equal diameter driving means. Driven sprocket 80 (Fig. 15) supports one end of the bottom chain saw 77, while the other end extends over idler sprocket 81. Idler sprocket 81 is adjustable to tighten the chain saw being mounted on flat sided axle 82 in slot 83 in mounting plate 75. Endless conveyor chains 86, as three in number, or more, are mounted on driven sprockets 87 and idler sprockets 88. These chains (see Figs. 25, 25a and 26) are formed of links provided with rollers 89 and cane or cane stalk holding means comprising holding arms 90 and positioning arms 91 of a modified bell crank form. These rollers 89 may ride in a channel trackway 94 secured upon front covering plate 34 entering through slots 95 and 96, Fig. 9. A curved spring plate 92, Fig. 25, carried by plate 34 serves to engage positioning arms 91 and cause arms 90 to assume a position at right angles to the face of plate 34, whereby said arms will serve to convey or carry upwardly of said front plate 34 to its top cut cane stalks and deposit them upon stripping rollers 93. Conveyor chains 86 function to convey the stalks whether the same are more or less upwardly disposed or lying prone or horizontal before cutting by reason of the fact that the stalks, upright and prone, constitute one entanglement so that as the arms readily engage the prone stalks the more or less upright stalks are carried vertically by reason of their entanglement with the prone stalks. Also as the vertical stalks are cut they will ordinarily fall towards, and be pressed against, the elevatable unit so that the somewhat compressed mass is rendered more readily elevatable. Driven sprocket 87 and idler sprocket 88 are mounted at the top and bottom respectively of the cane cutting and elevating unit 22.

Driving mechanism for the above described parts of my invention consists of the following: The drive shaft 100, Figs. 1, 6 and 7, of an internal combustion engine 101 ordinarily operating as a source of power to drive the cutting and all other mechanism except it does not propel the truck, has bevel gear 102 engaging bevel gear 103 keyed to shaft 104. Driving sprocket 105 is keyed to shaft 104. Over driving sprocket 105, Figs. 6, 7, and 5, extends sprocket chain 106 and said chain 106 extends over idler sprocket 107, thence over sprocket 108 keyed to shaft 109, thence up and over sprocket 110 keyed to shaft 111, thence under idler sprocket 112 to driving sprocket 105.

Figure 15:
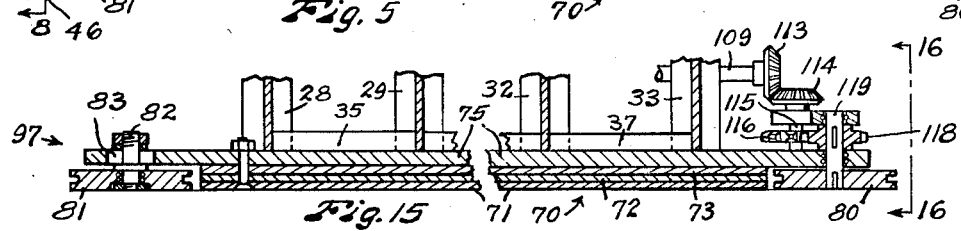
Fig. 15 is a fragmentary sectional view of said horizontal cane cutting assembly taken substantially on broken line 15—15 of Fig. 14.
Figures 16, 17:
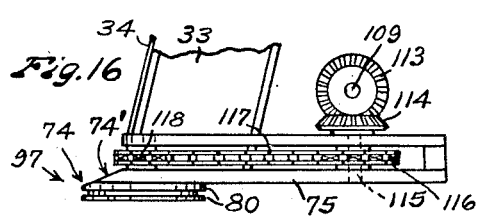
Fig. 16 is a fragmentary side elevation looking in the direction of broken line 16—16 of Fig. 15 and showing driving means for the horizontal cane cutting means.
Fig. 17 is a fragmentary cross section with parts in elevation showing the horizontal cutter bar and illustrating the mode of operation of an inclined plate in helping as a wedge to break off a stalk of cane which has received a partial saw cut.

Driving mechanism for the bottom saw chain 77 carried by blade 70 of bottom cutting mechanism 97 is provided by beveled gear 113, Figs. 7, 5, 14, 15 and 16, meshing with bevel gear 114 keyed to shaft 115 on which is keyed sprocket 116. A sprocket chain 117 (Figs. 14 and 16) extends over sprocket 116 and 118 keyed to shaft 119 (Figs. 14 and 15) on which is keyed driving chain cutting or saw sprocket 80 (Figs. 14 and 15).

Driving mechanism for the side chain saws 53 is provided by sprocket 120 keyed to shaft 111 (Figs. 7 and 6). Sprocket 120 is connected to driving sprocket 121 (Figs. 7, 10 and 12) keyed to shaft 52 by sprocket chain 122. Since driving side chain sprocket 51 (Figs. 5, 7, 8 and 12) is keyed to shaft 52, the side chain saws 53 are actuated.

Conveyor or elevating chain driving sprockets 87 (Figs. 7 and 5) are keyed to shaft 123 on which is keyed driving sprocket 124 which in turn is connected by sprocket chain 125 to driving sprocket 126 keyed to shaft 111 which thus transmits power to sprockets 87.

Cane cutting and elevating unit 22 is manually controlled and held in the desired cane cutting plane above the ground and raised as rocks or other obstacles may require to avoid injury to the cutting or chain saws 53 and 77 by compressed air acting upon rod 127a and piston 127 in double acting air cylinder 128, which cylinder is secured to brackets 129 supported by plates 24. Piston 127 is secured to universal coupling means 130 mounted on plate 75 (Fig. 14). Compressed air conduits 98 and 99 (Fig. 7) communicate with standard compressed air reservoirs, not shown. The operation of said rod and piston 127 is controlled by valves (not shown) in the cab.

A desired number of stripping rolls 93 (Figs. 2 and 28), arranged in pairs and disposed longitudinally of the truck, are mounted in spaced relation above the motor 101 and have their forward ends located to receive cane stalks from delivery means next to be described. An apron 131, hingedly mounted at 132 on I beams 28, 29, 30, 31, 32, and 33, Fig. 7, extends to plate 133 (Figs. 2 and 7) secured on side frame members 134 forming the sides of the frame for the deck 135 of the truck. Said apron 131 can move up or down with cane cutting and elevating unit. To hold the apron 131 at a desired angle, apron rest 136 is provided. Thus, the apron serves to convey the cut cane stalks to the plate 133. Through openings 137 in said plate 133 conveyor means (described below) extend and carry the stalks rearward.

Rollers 93 are mounted with their forward ends in bearings 138 carried in cross frame 139 (Figs. 28 and 2). The other end is mounted in a box bearing 140. Rear rollers 141 are identical to rollers 93 and have their one end portions mounted in said box bearing 140 and the other ends of said rollers mounted in bearings 142 (similar to bearings 138) carried by cross frame 143 (Fig. 2).

Inner vertical frame members 144, 145, 146, 147 and 148 (Fig. 1) are fixedly held by bracing plates 149, 150, 151, 152, and 153 to truck side frame beams 23. Cross beams 154 (Fig. 3) are secured to beam 23 and extend to the sides to form supports for outside vertical frame members 155 which together with said inside vertical frame members support (a) the cross beams 139, 140, 143, 156, Fig. 2, and (b) the cross beams 158 (Fig. 3) which carry walk platforms 159 (Figs. 1, 2 and 3) extending along the truck sides over the rollers 93 and 141. A cab 160 (Fig. 1) is provided on the front end of the truck. Railing 161 provides a guard for walk platforms 159.

Between sets of rollers 93 is rear and longitudinally extending conveyor means identified generally as 170 (Fig. 25a) in the form of a chain 157 with holding arms 171 which have positioning arms 171a running in a trackway 172 (Fig. 3). This conveyor means 170 is similar in construction to the front or vertical conveyor means comprising chains 86 with arms 90 and 91, Figs. 25, 26 and 27, in fact the links with their associated arms are interchangeable. A suitable number of these conveyor means, three being shown, may be provided. The only difference in the conveyor means 170 is that the trackway corresponding to 94 stops short of the end as shown in Fig. 25a to permit the arms 171 to drop horizontally before passing around the rear idling sprockets 178 as shown in Fig. 25a.

A driving means for conveyor means 170 is provided as follows: A driving sprocket 173 is keyed to shaft 104, Figs. 1 and 6, sprocket chain 174 connects sprocket 173 to sprocket 175 (Fig. 30) keyed on shaft 176 (Figs. 1 and 30) to which are also keyed conveyor driving sprockets 177, over which extend conveyor chains 157. Said chains 157 also pass over idler sprockets 178 revolvably mounted on shafts 179, 180, and 181. To tighten conveyor chain 170, adjustable idler sprockets 182 are mounted on separate shafts 183, 184 and 185. Shafts 179, 180 and 181 are mounted in standard adjustable bearings, not shown.

Longitudinal rollers 93 are driven as follows: Driving sprocket 190 (Figs. 1, 3, and 7) keyed to shaft 100 has sprocket chain 191 (Fig. 3) connected to driven sprocket 192 keyed to shaft 193 carried by brackets 194. Also, keyed to shaft 193 are sprockets 195 and 196 constituting a double sprocket member. Over sprocket 195 extends sprocket chain 197 which engages sprockets 198 and 199 arranged in pairs and respectively mounted upon rollers 93 passing over 198 and under 199 and over adjustable idler roller 200, having slidable mounting, not shown, of standard construction. Similarly over sprocket 196 extends sprocket chain 201 which engages sprockets 202 and 203 arranged in pairs and respectively mounted upon end portions of other rollers 93, passing over 202 and under 203 and over standard adjustable idler roller 204.

A driving engine 237 propels the truck over the ground and has shaft 233 connected to conventional mechanism for driving all wheels. A hood 186 extends from the rear to the front end of the truck to protect the engines 237 and 101 from falling cane tops and to convey said tops to the ground in front of the front and rear tires of the truck.

A bailer or bundler 231 is provided as follows: At the rear of the truck a compressed fluid cylinder 234 is operatively mounted on each side portion of the truck. In each of said cylinders, a rod 235a and piston 235 has arm 236 mounted thereon, said arm being swingingly mounted in horizontal plane. When the bailer hopper 231 is being filled, the arm 236 is swung crosswise of the truck so as to permit the cane stalks to have a clear fall from the deck 135, after being deposited upon and shoved over the deck by conveyors 170. When it is desired to compress the bundle, the arms 236 are swung to a position lengthwise of the truck, shown in full line, Figs. 1 and 2, and the piston with the arm is forced down by fluid pressure to exert its compression force until the operator makes fast the wire slings (not shown) about the bundle of cane which may weigh from one-half to some two tons.

A compressed fluid cylinder 239 with rod 241a and piston 241 may be employed to push the bundle of cane off the rear end so that it will fall upon the ground. Previously tail gates 242 are released to permit such discharge of the bundle. While said piston 235 is in operation and the bundle is being secured in the slings, two air operated stop members in the form of rod 243a and pistons 243 operating in cylinders 244 are provided to hold the cane stalks on the rear deck portion until the arms 236 are swung into crosswise position of the truck to clear for the fall of the cane stalks for the next bundle.

In the modified form of my invention, shown in Figs. 31, 32, and 33, the rollers 93 and associated driving mechanism are omitted. In place of the rollers I provide plain plates 205 to provide a deck beneath the conveyor means 170, i. e., the conveyor means 170 is the same in the modified form as in the forms heretofore shown. In place of walk platforms 159 above the rolls 93, I provide on each side below the conveyor means, overhanging platforms 206 on which operators may stand.

A chain saw means 207 identical in construction to side chain means 25 and bottom chain saw means 97 is operatively disposed upon each side of the truck.

In order that the machine may operate at its full cutting capacity, a second set of top cutting saws 207' in all respects like 207 including driving means are operatively mounted on each side of the truck. The mounting plate 208 (Fig. 34) for the saw means 207 is secured to the truck body frame members 134. Since the mechanism of duplicate side chain saw means 207' is the same as 207, in the interest of brevity, the same will not be further described in detail. Plate 208 may carry a bearing for driving shaft 209 on which driving sprocket 210 is keyed. Shaft 209 extends through an opening in plate 208. The other end of plate 208 supports a shaft 211 on which idler sprocket 212 is journaled. Over sprockets 210 and 212 extends the chain saw 213 (identical in construction to chain saws 53 and 77).

Driving mechanism for the shaft 209 to drive chain saw 213 may comprise a sprocket 214 connected by sprocket chain 215 to sprocket 216 keyed on shaft 217. Bevel gear 218 is keyed to shaft 217 meshing with bevel gear 219 keyed on shaft 220 which also has keyed thereon bevel gear 221 meshing with bevel gear 222 keyed on shaft 104 which is driven by engine 101 as above set forth.

Top conveyor means in this modified form of Figs. 31, 32, 33 and 34 is the same as top conveyor means 170 in the form first described. Driving means in the modified form for said top conveyor means 170 may be provided as follows: On shaft 217 is idly mounted bevel gear 223 meshing with driving sprocket 219. Bevel gear 223 has an extension sleeve 224 extending through bearings 225. On sleeve 224 is keyed sprocket 226 over which extends sprocket chain 227 to driving sprocket 228 which is keyed to shaft 229 having sprockets 230 keyed thereon at the rear end of the machine. At the front end of the machine in the modified form are idler sprockets 230'. Over sprockets 230 and 230' are disposed top conveyor means 170. Thus, it is manifest that in the modified form, the driving sprockets located at the rear of the machine are the reverse of the form of the invention shown in Figs. 2 and 30.

In this modified form, operators will stand on platform 206 and grasp the cane stalks by the tops and pull them crosswise of the truck until the top extends out over the edge of the deck 205 and then allow the conveyor means 170 to carry the stalks rearward and under the chain saw 207. The tops with the leaves will then be cut off and fall into the chutes 232 on each side which conveys said tops and leaves downward to the ground in front of the rear wheels, thereby providing traction on wet ground and protecting the roots against injury by the wheels. It will be understood that cutting off the tops of sugar cane stalks removes all the leaves because the leaves grow from the top end portion.

The mode of operation of my invention will be apparent in large measure from the above, so that the following is supplemental in character:

The device of my invention is driven to the cane field and the cane cutting unit 22 is lowered to the extent to bring the bottom cutting means 97 to the elevation at which it is desired to cut the cane stalks, Fig. 4. Such unit 22 is so lowered by operating the compressed air rod and piston 127 in cylinder 128, i. e., it is manually controlled. By employing compressed air or fluid means it is possible for the operator to promptly elevate the entire unit 22 comprising side 25 and bottom cutting means 97 with associated parts, and cane elevating means 90, above any ordinary obstruction as a rock or boulder. He has instant control and as soon as the obstruction is passed he can lower the unit 22 by releasing the compressed air or fluid to operating position again. In the meantime the operation of the bottom chain saws 77 and the side chain saws 53 as well as the cane elevating means 90 are not interrupted, a feature made possible by employing an endless chain 106, bevel gear 103 and sprocket 105. Such driving means is fully operative independently of the point to which unit 22 may be elevated with respect to its mounting frame 21 and even during its elevation unit 22 continues cutting. Unit 22 is guided in its upward and downward movement by guide blocks 27, Figs. 5 and 6, between I beams 28, 29, 30, 31, 32 and 33 and mounting plate 21.

Side cutters 25 extend below bottom cutter 97 and as the chain saw 53 runs in an upward direction it picks up prone cane stalks and if not cut at once it completes this cutting when such stalks strike stops 79. The cut cane is held against falling forward by the uncut cane. As the machine moves forward the cut cane is engaged by the cane elevating means 90 and carried to the top of unit 22 where it slides down apron 131 to the rollers 93 which function to strip the stalks of their leaves. The leaves then fall upon hood 186 and are discharged upon the ground in front of the front and rear truck wheels where they serve to provide traction on the wet ground. The stripped stalks then pass to the bailer 231.

It is ordinary for fields of growing sugar cane to abut upon a field of mature cane which is ready for cutting, i. e. the fields are continuous in character, and the cane from one field leans over and extends into the cane rows of the field adjacent so that a tangled and interwoven "jungle" is formed, as it were, not only within a given field but also between the fields. It is therefore necessary, if a machine is to be employed to mechanically cut the cane, that the machine be so constructed as to be capable of cutting a channel through the cane on the margin of the mature cane field as the first swath. This requires means to cut the cane on the sides of the swath as well as severing the stalks just above the ground. The side cutter means 25 and the bottom cutter means 97 of my invention accomplish the cutting of just such a "channel" through the growing cane.

The character and mode of operation of the chain saws 53 and 77 are fundamentally important in achieving the results of my invention. A stalk of sugar cane cross sectionally considered has an annular ring of hard brittle fiber and a soft sugar producing pith in the center portion. This pith is characterized by being exceedingly sticky so that any mechanical cutting mechanism to successfully operate must be self-cleaning, otherwise the pith will gradually accumulate, clog and render inoperative the cutting mechanism. Any portion of the stalk and pith cut away must be immediately removed from the face of the cutting edge or edges. That is, the cut away particles cannot be removed by raker teeth as in the case of sawing a kerf in wood. The construction for cutting sugar cane stalks must provide for immediate escape of the cut portion from the face of the cutting edge. Referring to Figs. 18, 19, 20, 21, 22 and 23, it will be seen that the portion of the cane stalk and pith cut by center tooth 57, for example, Fig. 19, is free to immediately escape to the side towards which bevel face 63 is open. In fact, the bevel face 63 will force the cut portion away from the longitudinal axis of the chain. The next beveled cutting face 60 will force the cut portion or segment in a direction opposite to that of face 63. Thus, face 58 of link center tooth 56 is followed by a side tooth 54 with a beveled face 59 oppositely directed. Next, in advance is beveled face 63 of center tooth 57 which faces the same direction as face 59, and next after face 63 of center tooth 57 is beveled face 60 of side tooth 55 open in the opposite direction. Hence, preferably to provide a balance of forces and keep the chain running true, the direction of the beveled face of each center tooth alternates, and each side tooth has a beveled face directed oppositely to that of the next side tooth in advance. However, it will be noted that opposite each beveled face there is no chain member obstruction to prevent or interrupt the free discharge of the cut segment or stalk portion either in the case of the center tooth or side tooth. For example, opposite the beveled face 59, the low dummy link 78 (see Fig 24) is located so that there is no obstruction. Opposite beveled face 63 of center tooth 57 there is a gap between the link 78 and the side link 55. Opposite beveled face 60 of side link 55 is located another dummy link 78 so that being of low construction, it presents no obstruction to the escape of the stalk portion or segment cut by the cutting edge of beveled face 60.

The cutting means 97 of my invention operates to make a partial cut into the stalk at the line of severance (i. e., line where the saw chain 77 engages the stalk and makes a kerf) above the root portion; then into this cut or nick, as it were, is formed the wedge 74 which applies a wedging action against the portion above the root. Note well, the wedge is not prying upon the root portion. The downward force of the wedging action is sustained by the machine supported plate 75, and thus the root portion below the cut is preferably relieved of the pressure of the entering wedge. As the truck moves forward the cane stalk is forced backward by the uncut stalks directly ahead and thus forces the stalk being cut backward with the beveled portion 74' of plate 75 as the fulcrum. Such forcing back of the stalk insures its severance by breaking in the event it has not previously been completely severed by the cutting action of the chain saw 97 or the combined force of the cutting and breaking action.

Figure 18A:
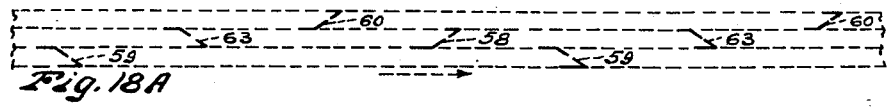
Fig. 18A is a diagrammatic view of the cut or kerf of the chain saw cutting mechanism illustrating the segments or portions of stalk cut away by side and center links in making the kerf.

In Fig. 18a it will be seen how the stalk is severed by segments or portions being cut away one-third the width of the kerf by each cutting link.

The necessity for high speed in operating the saw chain is manifest when it is remembered that the link cutting edges of the saw of my invention are not propelled through the stalk at the rate they cut or by their own weight, as in a wood saw, but are forced forward at the rate of travel of the truck so that the severing of the stalk preferably is augmented by the breaking of the uncut part of the stalk. There is no set in the link cutting edges and thus a single tooth may be sharpened or a nick removed without sharpening the remaining teeth or links as their height is the same as hereinabove set forth. The passing of the chain links about their mounting sprockets, as 80 and 81, Fig. 15, or around a turn, as point 240, Fig. 14, serves to open the saw links and free any adhering sticky cane pulp or pith. The centrifugal force developed by the operation of the chains will also function to assist the saw links in being self-cleaning.

It will be understood that when the field is cut for the first time, the rows of sugar cane are substantially flat, i. e., without troughs or valleys between the rows. However, when the field is on hilly ground then rows must be hilled with troughs between to stop erosion. However, the troughs follow the contour lines in a general way rather than directly up and down the hill, i. e., the rows do have grades. Most of the fields in the Hawaii district are on hilly ground so that the problem of providing traction is complex. Also, note well that traction effort must be provided down hill or sidewise to hold the machine on the side hill in two directions—against the slope of the hill as well as forwardly in the direction of propulsion which means up and down grade. As cultivation proceeds on the fields of level ground then the rows also become hills with valleys or troughs therebetween. It is necessary that the traction effort to operate the truck carrying the cutter mechanism part of my invention be such as not to injure the roots of the sugar cane either in the newly planted flat fields or in the older fields having hollows or troughs. By cutting the tops and leaves from the cut cane stalks and depositing them upon the ground in front of the wheels, my invention provides for the necessary traction and protection of the roots. The leaves and tops will form a compressed mat beneath the tires of from almost one to four inches. In producing this mat my invention includes having the tires at low pressure, i. e., twenty to forty pounds and of a size which will fill or occupy a substantial portion of the trough so that the side walls will conform to and engage the sides of the trough to augment the gripping area. The sugar cane in the hill develops a root growth that renders the row hill relatively firm, and it is the purpose of my invention to take advantage of this condition through the contacting of the side walls of the tires with the slope of the row hills in securing or augmenting the necessary traction to move the cutting mechanism against the cane stalks while being cut. By providing the tire with such pressure and proportion as respectively to conform to and occupy the trough and thus contact the sides of the relatively firm hills, even when wet, provides the necessary traction without injury to the roots. However, preferably I augment the traction and provide for extra protection to the cane roots by returning the tops and leaves to the ground in front of the wheels where they are pressed into a mat by the low pressure tires of large width which provides relatively large ground contact area. The leaves and tops under the tires particularly of this character provide a mat which safeguards the roots and builds up traction without slippage even in the soft ground. A tire which will meet the requirements of the rows as presently constructed in the sugar cane fields of Hawaii is that designated as 18.00 x 24. Thus I provide for a cutting mechanism which must be carried or forced against the sugar cane stalks while the chain saw cuts therein or therethrough and the advancing cutter mechanism breaks the stalks and at the same time I provide the necessary accompanying traction for the tires even in wet ground to so carry or force the cutting mechanism against the cane stalks and without injury to the roots—the cutting mechanism providing the cut stalks, tops and leaves for forming the mat to protect the roots and supply traction.

Obviously, changes may be made in the forms, dimensions, and arrangement of the parts of my invention, without departing from the principle thereof, the above setting forth only preferred forms of embodiment.

I claim:

1. A sugar cane harvesting mechanism comprising a power driven truck; a mounting frame mounted on the front end of said truck; an elevatable cane cutting unit slidably mounted on said frame; a horizontally disposed link chain cutting means mounted at the bottom and across the front of said unit; compressed fluid means operatively connected to said elevatable unit for raising and lowering the same; a driving sprocket mounted on said truck; driving sprockets mounted on said elevatable unit; beveled gear means connecting one of said last mentioned sprocket means to said link chain cutting means; sprocket chain means connecting both of said sprocket means whereby said cutting means is maintained in operation simultaneously with the lowering and raising of said unit.

2. A sugar cane harvesting mechanism for severing cane stalks grown in rows with hills and troughs therebetween comprising a power driven truck having pneumatic tires of a size permitting their conforming to the side walls of the trough between the rows whereby the firmness of the hills facilitates providing traction without slippage; a mounting frame mounted on the front end of said truck; an elevatable cane unit slidably mounted on said frame; link chain stalk cutting means operatively mounted on said unit; means for removing the leaves from the stalks; and means conveying the said leaves to the ground in front of the wheels for traction and cane root protection.

3. A sugar cane harvesting mechanism comprising a power driven truck; a mounting frame mounted on the front end of said truck; an elevatable cane cutting unit slidably mounted upon said frame; a horizontally disposed link chain cutting means mounted at the bottom and across the front of said unit; a plurality of pairs of rollers disposed longitudinally and on top of the truck, the members of each pair being revolvable toward each other on their top sides whereby the leaves of the cane stalks are stripped; means conveying the said leaves to the ground in front of the wheels for traction and cane root protection; conveyor means disposed longitudinally of the truck and between certain pairs of said rollers for moving the cane stalks longitudinally of the truck; and power means for actuating said cutting means, conveyor means and rollers.

4. A sugar cane harvesting mechanism comprising a power driven truck; a mounting frame mounted on the front end of said truck; an elevatable cane cutting unit slidably mounted upon said frame; a horizontally disposed link chain cutting means mounted at the bottom and across the front of said unit; a plurality of pairs of rollers disposed longitudinally and on top of the truck, the members of each pair being revolvable toward each other on their top sides whereby the leaves of the cane stalks are stripped; means conveying the said leaves to the ground in front of the wheels for traction and cane root protection; conveyor means disposed longitudinally of the truck and between certain pairs of said rollers for moving the cane stalks longitudinally of the truck; a bundling hopper disposed to receive stripped cane stalks from said conveyor means; and power means for actuating said cutting means, conveyor means and rollers.

5. A sugar cane harvesting mechanism comprising a power-driven truck; a vertically disposed mounting frame secured on the front end of said truck; a cane cutting unit slidably mounted on said mounting frame; and a substantially instantaneous elevating and downwardly driving power mechanism on the carrier connected to said cutting unit, whereby said unit may be power elevated and power lowered.

6. A sugar cane harvesting mechanism comprising a power-driven truck; a vertically disposed mounting frame secured on the front end of said truck; a cane cutting unit slidably mounted on said mounting frame comprising a cane cutting means and a cut-cane elevating means; and a substantially instantaneous elevating and downwardly driving power mechanism on the carrier connected to said cutting unit, whereby said unit may be power elevated and power lowered.

7. A sugar cane harvesting mechanism comprising a power-driven truck; a vertically disposed mounting frame secured on the front end of said truck; a cane cutting unit slidably mounted on said mounting frame having a front plate disposed across the width of the machine, a link chain cutting means horizontally disposed along the bottom edge portion of said front plate, and a cut-cane elevating means; and a substantially instantaneous elevating and downwardly driving power mechanism on the carrier connected to said cuting unit, whereby said unit may be power elevated and power lowered.

8. A sugar cane harvesting mechanism comprising a power-driven truck; a vertically disposed mounting frame secured on the front end of said truck; a cane cutting unit slidably mounted on said mounting frame having a front plate disposed across the width of the machine, a link chain cutting means horizontally disposed along the bottom edge portion of said front plate, a link chain cutting means vertically disposed and mounted upon each side edge portion of said front plate, and a cut-cane elevating means; and an elevating and downwardly driving power mechanism on the carrier connected to said cutting unit whereby the said unit may be power elevated and power lowered.

9. A sugar cane harvesting mechanism comprising a power-driven truck; a mounting frame secured on the front end of said truck; an elevatable cane cutting unit slidably mounted on said frame having a front plate, a link chain cutting means horizontally disposed along the bottom edge portion of said front plate, a link chain cutting means vertically disposed and maintained on each side of said front plate and a cut-cane elevating means; a top deck; stalk conveyor means disposed longitudinally of said deck; a link chain cutting unit mounted on a side of said deck whereby the tops with attached leaves of said stalks may be removed; and means conveying the said tops to the ground in front of the wheels for traction and cane root protection.

10. A harvesting mechanism comprising a power-driven truck; a vertically disposed mounting frame secured on the front end of said truck; a stalk cutting unit slidably mounted on said mounting frame comprising a link chain cutting means comprising a mounting plate having a beveled front edge, a blade having a beveled front edge which registers with and continues the bevel of the said mounting plate and a recess in said blade's periphery, sprockets mounted at the end of said mounting plate, a chain of link tooth cutters mounted in the recess of said blade and extending over said sprockets whereby a partial cut may be made in said stalk by said chain cutters and the beveled front edge of the blade and the mounting plate may be caused to extend into said partial cut stalk as a wedge to cause the stalk to break, and cut-stalk elevating means; and instantaneously operating power means operatively connected to said cutting unit whereby said cutting unit may be instantaneously raised and lowered with respect to said mounting frame.

11. A stalk harvesting mechanism comprising a power-driven truck; a vertically disposed mounting frame secured on the front end of said truck; a stalk cutting unit slidably mounted on said mounting frame comprising a link chain cutting means comprising a regular succession of side cutting links alternating with center cutting links, said side cutting links alternating with said center cutting links, said side cutting links having a beveled face directed to the opposite side of the chain and lying in a plane substantially normal to the axis of the chain and said center cutting links having a beveled face directed toward the side of the chain opposite to that of the side link next in advance and lying in a plane substantially normal to the axis of the chain, each of said cutting links having a flat top face lying in a plane substantially parallel to the axis of the chain; and instantaneously operating power means operatively connected to said cutting unit whereby said cutting unit may be instantaneously raised and lowered with respect to said mounting frame.

12. In a harvesting mechanism comprising a power-driven truck; a vertically disposed mounting frame secured on the front end of said truck; a link chain stalk cutting unit slidably mounted on said mounting frame comprising a stalk cutting means disposed in front as the first part of the machine to contact the stalks to be cut; and a substantially instantaneous elevating and downwardly driving power mechanism on the carrier connected to said cutting unit, whereby said unit may be power elevated and power lowered.

13. In a harvesting mechanism a driven truck; a mounting frame carried by said truck; a controlled-reciprocable slidable frame mounted on said mounting frame extendable to a point adjacent the ground and elevatable thereabove; a horizontally disposed link chain cutting means mounted adjacent the bottom and across the front of said slidable frame; power actuating means operatively connected to said slidable frame whereby said frame may be raised and lowered; and a power actuating means operatively connected to said link chain cutting means whereby the same may be driven simultaneously with the lowering and raising of said slidable frame.

14. In a harvesting mechanism a driven truck; a mounting frame carried by said truck; a controlled-reciprocable slidable frame mounted on said mounting frame extendable to a point adjacent the ground and elevatable thereabove; a horizontally disposed link chain cutting means mounted adjacent the bottom and across the front of said slidable frame; instantaneously operating power means operatively connected to said slidable frame; and a power actuating means operatively connected to said link chain cutting means whereby the same may be driven simultaneously with the lowering and raising of said slidable frame.

15. In a harvester mechanism a substantially horizontally disposed mobile carrier; a substantially vertically movable cutting unit mounted on said carrier, having mounted thereon a power driven link chain cutting means operable in a substantially horizontal plane across the lower portion of said unit; and an elevating and downwardly driving power mechanism on said carrier and connected to said cutting unit, whereby said unit may be power elevated and power lowered.

16. In a harvester mechanism a substantially horizontally disposed mobile carrier; a substantially vertically movable cutting unit mounted on said carrier having mounted thereon a power driven link chain cutting means operable in a substantially horizontal plane across the lower portion of said unit; elevating mechanism for the cut product on said cutting unit; and an elevating and downwardly driving power mechanism on said carrier and connected to said cutting unit, whereby said unit may be power elevated and power lowered.

17. In a harvester mechanism a substantially horizontally disposed mobile carrier; a substantially vertically movable and substantially sheet metal covered cutting unit mounted on said carrier having mounted thereon a power driven link chain cutting means operable in a substantially horizontal plane across the lower portion of said unit; and an elevating and downwardly driving power mechanism on said carrier and connected to said cutting unit, whereby said unit may be power elevated and power lowered.

18. In a harvester mechanism a substantially horizontally disposed mobile carrier; a substantially vertically movable cane cutting unit mounted on said carrier having mounted thereon a power driven link chain cutting means operable in a substantially horizontal plane across the lower portion of said unit; and a substantially instantaneous elevating and downwardly driving power mechanism on said carrier and connected to said cutting unit whereby said unit may be power elevated and power lowered.

19. In a harvester mechanism a substantially horizontally disposed mobile power driven carrier; a substantially vertically movable cane cutting unit mounted on said carrier having mounted thereon a power driven link chain cutting means operable in a substantially horizontal plane across the lower portion of said unit; elevating mechanism for the cut product on said cutting unit; and a substantially and instantaneous elevating and downwardly driving power mechanism on said carrier and connected to said cutting unit whereby said unit may be power elevated and power lowered.

20. In a harvester mechanism a substantially horizontally disposed mobile power driven carrier; a substantially vertically movable and substantially sheet metal covered cane cutting unit mounted on said carrier frame having mounted thereon a power driven link chain cutting means operable in a substantially horizontal plane across the lower portion of said unit; and an elevating and downwardly driving power mechanism on said carrier and connected to said cutting unit whereby said unit may be power elevated and power lowered.

21. In a cane harvester mechanism a substantially horizontally disposed mobile power driven carrier having pneumatic tires of a size to fill the trough between the rows and engage the sides of the trough; a substantially vertically movable cutting unit mounted on said carrier having mounted thereon a power driven link chain cutting means operable in a substantially horizontal plane across the lower portion of said unit; and an elevating and downwardly driving power mechanism on said carrier and connected to said cutting unit whereby said unit may be power elevated and power lowered.

22. In a harvester mechanism a substantially horizontally disposed mobile power driven carrier; a substantially uprightly disposed cutting unit mounted on said carrier having mounted thereon a power driven link chain cutting mechanism operable in a substantially horizontal plane across the lower portion of said unit; elevating mechanism for the cut product on said cutting unit; and a substantially instantaneous elevating and downwardly driving power means on said carrier and connected to said cutting unit whereby said unit may be power elevated and power lowered.

23. In a harvester mechanism a substantially horizontally disposed mobile power driven carrier; a substantially uprightly disposed and substantially vertically movable cane cutting unit mounted on said carrier having mounted thereon a power driven link chain cutting mechanism operable in a substantially horizontal plane across the lower portion of said unit; a link chain mounting means for said link chain; elevating mechanism for said link chain; elevating mechanism for the cut product on said cutting unit; and a substantially instantaneous elevating and downwardly driving power means on said carrier and connected to said cutting unit whereby said unit may be power elevated and power lowered.

24. In a harvester mechanism a substantially horizontally disposed mobile power driven carrier; a substantially uprightly disposed and substantially vertically movable cane cutting unit mounted on said carrier having mounted thereon a power driven link chain cutting mechanism operable in a substantially horizontal plane across the lower portion of said unit; a link chain mounting means for said link chain having a bevelled top edge extending to the link chain; elevating mechanism for the cut product on said cutting unit; and a substantially instantaneous elevating and downwardly driving power means on said carrier and connected to said cutting unit whereby said unit may be power elevated and power lowered.

25. In a harvester mechanism a substantially horizontally disposed mobile power driven carrier; a substantially uprightly disposed and substantially vertically movable cane cutting unit mounted on said carrier having mounted thereon a power driven link chain cutting mechanism operable in a substantially horizontal plane across the lower portion of said unit; a link chain mounting means for said link chain having a bevelled top edge extending to the link chain; a plate mounted on top of said link mounting means having a bevelled front edge registering with the bevel edge of said link chain mounting means whereby the front edge of said bevelled portion may enter beneath the bottom edge of the stalk adjacent the top of the cutting chain, and a breaking prying force applied to the stalk; elevating mechanism for the cut product on said cutting unit; and a substantially instantaneous elevating and downwardly driving power means on said carrier and connected to said cutting unit whereby said unit may be power elevated and power lowered.

26. In a harvester mechanism a substantially horizontally disposed mobile power driven carrier; a substantially uprightly disposed and substantially vertically movable cutting unit mounted on said carrier having mounted thereon a power driven link chain cutting mechanism operable in a substantially horizontal plane across the lower portion of said unit; and having a power driven link chain cutting means operable in a substantially upright plane adjacent an end portion of said horizontally disposed link chains; cutting means whereby one side of a channel of cut cane may be made through the jungle of growing cane; elevating mechanism for the cut product on said cutting unit; and a substantially instantaneous elevating and downwardly driving power means on said carrier and connected to said cutting unit whereby said unit may be power elevated and power lowered.

27. In a harvester mechanism a substantially horizontally disposed mobile power driven carrier; a substantially uprightly disposed and substantially vertically movable cutting unit mounted on said carrier having mounted thereon a power driven link chain cutting mechanism operable in a substantially horizontal plane across the lower portion of said unit; and having side power driven link chain cutting means operable in a substantially upright plane adjacent each end portion of said horizontally disposed link chain cutting means whereby a channel may be cut through the jungle of growing cane; elevating mechanism for the cut product on said cutting unit; and a substantially instantaneous elevating and downwardly driving power means on said carrier and connected to said cutting unit whereby said unit may be power elevated and power lowered.

28. In a harvester mechanism a substantially horizontally disposed mobile power driven carrier; a substantially uprightly disposed and substantially vertically movable cutting unit mounted on said carrier having mounted thereon a power driven link chain cutting mechanism operable in a substantially horizontal plane across the lower portion of said unit; and having side power driven link chain cutting means operable in a substantially upright plane extending beneath each end portion of said horizontal link chain cutting means whereby cane disposed in a prone position close to the ground may be cut; elevating mechanism for the cut product on said cutting unit; and a substantially instantaneous elevating and downwardly driving power means on said carrier and connected to said cutting unit whereby said unit may be power elevated and power lowered.

29. In a harvesting mechanism a driven truck; a sliding frame mounted on said truck extendable to a point adjacent the ground and elevatable thereabove; a side cutter having link chain cutting means mounted on said slidable frame; a horizontally disposed link chain cutting means mounted adjacent the bottom and across the front of said slidable frame; instantaneously elevating and downwardly driving power means operatively connected to said slidable frame; and a power actuating means operatively connected to said link chain cutting means whereby the same may be driven simultaneously with the lowering and raising of said slidable frame and a channel may be cut through the cane field.

30. In a harvesting mechanism a substantially horizontally disposed mobile carrier; a substantially vertically movable cutting unit mounted on said carrier having mounted thereon a power driven link chain cutting means operable in a substantially horizontal plane across the lower portion of said unit; and a double acting fluid cylinder on said carrier connected to said cutting unit, whereby said unit may be power elevated and power lowered.

31. In a harvesting mechanism a substantially horizontally disposed mobile carrier; and a substantially vertically movable cutting unit mounted on said carrier having a link chain cutting means comprising a regular succession of side cutting links alternating with center cutting links, said side cutting links having a bevelled face directed to the opposite side of the chain and lying in a plane substantially normal to the axis of the chain and said center cutting links having a bevelled face directed toward the side of the chain opposite to that of the side link next in advance and lying in a plane substantially normal to the axis of the chain, each of said cutting links having a flat top face lying in a plane substantially parallel to the axis of the chain.

32. In a harvesting mechanism a substantially horizontally disposed mobile carrier; and a substantially vertically movable cutting unit mounted on said carrier having a link chain cutting means comprising a regular succession of side cutting links alternating with center cutting links, said side cutting links alternating with said center cutting links, said side cutting links having a bevelled face directed to the opposite side of the chain and lying in a plane substantially normal to the axis of the chain and said center cutting links having a bevelled face directed toward the side of the chain opposite to that of the side link next in advance and lying in a plane substantially normal to the axis of the chain, each of said cutting links having a flat top face lying in a plane substantially parallel to the axis of the chain, and an elevating and downwardly driving power mechanism on said carrier and connected to said cutting unit, whereby said unit may be power elevated and power lowered.

33. In a harvesting mechanism a carrier means; a vertically disposed mounting frame secured on the front end of said carrier means; and a stalk cutting unit slidably mounted on said mounting frame comprising a link chain cutting means operable across the lower portion of said unit and a cut stalk elevating means.

34. In a sugar cane harvesting mechanism a power-driven truck; a mounting frame mounted on said truck; an elevatable cane cutting unit slidably mounted on said frame extendable to a point adjacent the ground; a horizontally disposed link chain cutting means mounted adjacent the bottom and across the front of said unit; an elevating and downwardly driving power mechanism on the carrier connected to said cutting unit whereby the said unit may be power elevated and power lowered; and a power actuating means operatively connected to said link chain cutting means whereby the same may be driven and is maintained in operation simultaneously with the lowering and raising of said unit.

35. In a harvesting mechanism a mobile power-driven carrier; a cutting unit mounting means secured on said carrier; and a cutting unit reciprocably, slidably mounted on said mounting means comprising a metal plate covering fixedly secured on said unit forming a face thereof, and a power-driven link chain cutting means operable across the lower portion of said unit.

36. In a harvesting mechanism a mobile power-driven carrier; a cutting unit mounting means secured on said carrier; and a cutting unit reciprocably, slidably mounted on said mounting means comprising a metal plate covering fixedly secured on said unit forming a face thereof, a power-driven link chain cutting means operable across the lower portion of said unit, and a power-driven link chain cutting means vertically disposed and mounted upon each side edge portion of said cutting unit.

37. A sugar cane harvesting mechanism comprising a power-driven truck; a vertically disposed mounting frame secured on said truck; a cane cutting unit slidably mounted on said mounting frame having a link chain cutting means horizontally disposed along the bottom edge portion of said unit; and a member having a bevelled edge disposed close to said link chain cutting means, said bevelled edge forming a wedge with respect to said cutting means whereby a partial cut may be made in a cane stalk by said link chain cutting means, and the bevelled member may be caused to extend into said partial cut stalk as a wedge to cause the stalk to break.

ROBERT ALEXANDER PATTEN.

REFERENCES CITED

The following references are of record in the file of this patent:

UNITED STATES PATENTS

| Number | Name | Date |
|---|---|---|
| 712,843 | Paul | Nov. 4, 1902 |
| 724,345 | Sloane | Mar. 31, 1903 |
| 740,633 | Downing | Oct. 6, 1903 |
| 788,270 | Luce | Apr. 25, 1905 |
| 929,087 | Hadley | July 27, 1909 |
| 1,028,671 | Brooks | June 24, 1912 |
| 1,119,886 | Severson | Dec. 8, 1914 |
| 1,237,859 | Balseiro | Aug. 21, 1917 |
| 1,344,624 | Ellis | June 29, 1920 |
| 1,387,511 | Powell | Aug. 16, 1921 |
| 1,414,319 | Zaiauskis | Aug. 25, 1922 |
| 1,459,247 | Pazos | June 19, 1923 |
| 1,485,527 | Raeber | Mar. 4, 1924 |
| 1,572,410 | Paine | Feb. 9, 1926 |
| 1,648,313 | Luce | Nov. 8, 1927 |
| 1,710,611 | Duncan | Apr. 23, 1929 |
| 1,717,547 | Bens | June 18, 1929 |
| 1,726,918 | Ohler | Sept. 3, 1929 |
| 1,756,664 | Sasaki | Apr. 29, 1930 |
| 1,908,966 | Falkiner et al. | May 16, 1933 |
| 1,975,089 | Falkiner et al. | Oct. 2, 1934 |
| 2,220,793 | Munson et al. | Nov. 5, 1940 |
| 2,224,662 | Thomson et al. | Dec. 10, 1940 |
| 2,279,183 | Stimatze | Apr. 7, 1942 |
| 2,281,904 | Wurtele | May 5, 1942 |
| 2,324,563 | Custenborder | July 20, 1943 |